Figure 1:
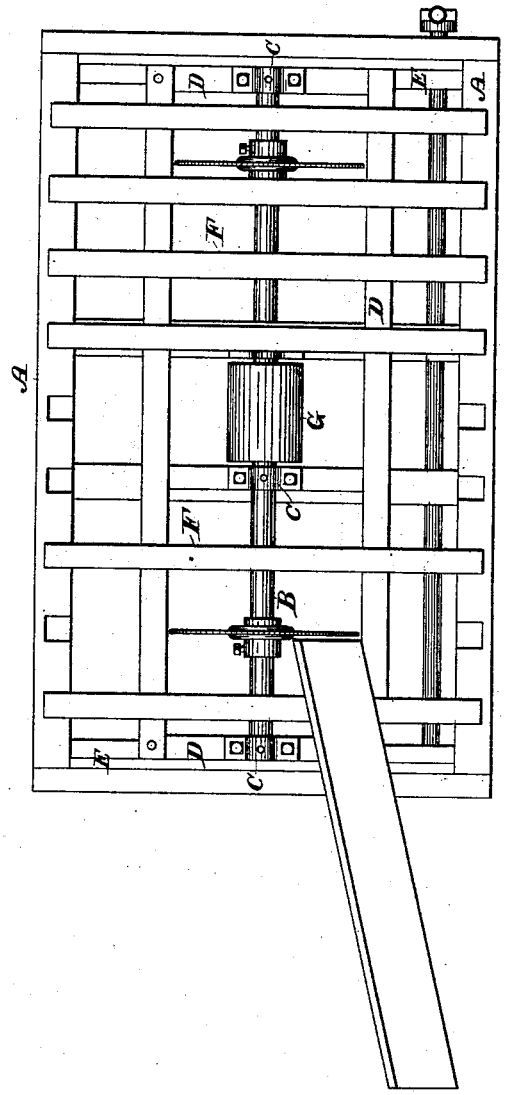

(No Model.)
2 Sheets—Sheet 1.

J. R. STRICKLAND.
CIRCULAR SAWING MACHINE.

No. 367,864.　　　　　　　　Patented Aug. 9, 1887.

WITNESSES
E. A. Newman,
C. M. Newman,

INVENTOR
James R. Strickland,
By his Attorneys
Baldwin Hopkins & Peyton.

N. PETERS, Photo-Lithographer, Washington, D. C.

(No Model.) 2 Sheets—Sheet 2.
J. R. STRICKLAND.
CIRCULAR SAWING MACHINE.
No. 367,864. Patented Aug. 9, 1887.
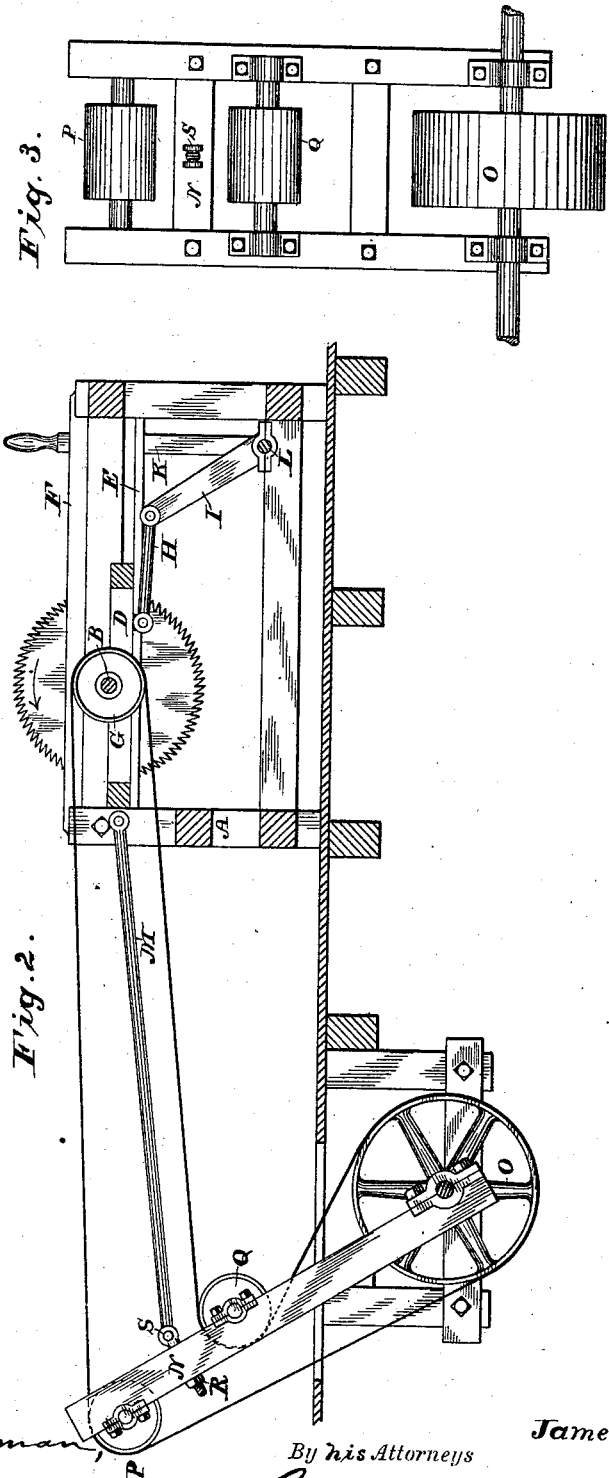
WITNESSES
E. A. Newman
C. M. Newman
INVENTOR
James R. Strickland,
By his Attorneys
Baldwin Hopkins & Peyton

UNITED STATES PATENT OFFICE.

JAMES R. STRICKLAND, OF WILMINGTON, NORTH CAROLINA, ASSIGNOR OF ONE-HALF TO S. & W. H. NORTHROP, OF SAME PLACE.

CIRCULAR SAWING MACHINE.

SPECIFICATION forming part of Letters Patent No. 367,864, dated August 9, 1887.

Application filed March 31, 1887. Serial No. 233,212. (No model.)

*To all whom it may concern:*

Be it known that I, JAMES R. STRICKLAND, of Wilmington, in the county of New Hanover and State of North Carolina, have invented a certain new and useful Improvement in Circular Sawing Machines, of which the following is a specification, reference being had to the accompanying drawings, in which—

Figure 1 is a top or plan view. Fig. 2 is a side elevation, partly in section; and Fig. 3, a front view of the swinging gear.

The object of my invention is to provide an improved portable saw-bench in which the saw-arbor, with one or more circular saws mounted upon it, has its bearings in a sliding reciprocating frame. I provide for driving the saw-arbor by means of belt-gearing upon a pivoted support connected firmly with the sliding saw-frame, so that in whatever position the frame may be the belt will always be taut and operate the same as if it were an ordinary belt running over but two pulleys with fixed relations to each other.

In the drawings, A designates a main frame of any suitable form.

B designates a saw-arbor, which may contain a single saw or a gang or gangs of saws. These saws are circular, and are adjustable longitudinally upon the arbor by any ordinary means—such, for example, as illustrated. The saw-arbor is mounted in ordinary bearings, C, upon a sliding reciprocating frame, D, supported upon tracks or ways E.

F indicates supporting-bars for the timber or lumber to be sawed.

G is the belt-pulley upon the saw-arbor.

H is a link pivoted to the under side of the saw-frame, and also pivoted to an arm, I, of the lever K, which is pivoted at L, and serves to reciprocate the saw-frame and saws.

M indicates a rod pivoted to the saw-frame at one end and to the arm N at the other end.

O is a belt-pulley, with its shaft journaled upon a stationary part of the main frame.

P and Q are guide-pulleys secured in bearings upon the arm N, which latter is pivoted to the shaft of the pulley O. The belt extends around these pulleys, as illustrated, so as to drive the saw-shaft. The arm N is pivoted so that its free end will oscillate on the shaft of the pulley O as a pivot to follow the sliding reciprocating movements of the saw-frame. By this means the weight of the beam and pulleys is supported upon the pivotal point of the arm, and but little force is required to move the arm with the sliding frame. In whatever position the sliding frame may be, it will be seen that the belt will always remain taut.

It will be practicable, by means of the nut R upon the bolt S, to regulate the tension of the belt as may be desired; but the tension will not be disturbed by the operation of the machine or the movement of the parts, and the belt will not require tightening ordinarily after once being fitted.

I am aware that portable saw-benches have been made before with sliding frames; but my construction is simple and easy of operation and does not require the employment of any tension device operating upon the plate to compensate for the movement of the parts while the machine is in operation.

What I claim to be new, and desire to secure by Letters Patent of the United States, is—

In a portable saw-bench, the combination, with a main frame, A, and a sliding frame, D, mounted thereon, and carrying a saw-arbor, B, and a circular saw, of the link H, pivoted to the sliding frame and to the arm I, which is provided with the operating hand-lever K, the rod M, pivoted to the sliding frame and to the arm N, which carries the guide-pulleys P and Q and is pivoted on the shaft of the pulley O, and the main belt-pulleys O and G, all constructed and arranged substantially as set forth.

In testimony whereof I have hereunto subscribed my name.

JAMES R. STRICKLAND.

Witnesses:
W. M. HUNT,
B. B. BRYAN.